US012521971B2

(12) United States Patent
Winterowd et al.

(10) Patent No.: US 12,521,971 B2
(45) Date of Patent: Jan. 13, 2026

(54) WATER-RESISTANT ROOF COVERBOARD PANELS

(71) Applicant: Continuus Materials Intellectual Property, LLC, The Woodlands, TX (US)

(72) Inventors: Jack G. Winterowd, Puyallup, WA (US); Matthew Spencer, Palatine, IL (US); Marko Suput, Lompoc, CA (US); Mya Fisher, Ames, IA (US)

(73) Assignee: CONTINUUS MATERIALS INTELLECTUAL PROPERTY, LLC, The Woodlands, TX (US)

( * ) Notice: Subject to any disclaimer, the term of this patent is extended or adjusted under 35 U.S.C. 154(b) by 335 days.

(21) Appl. No.: 18/300,047

(22) Filed: Apr. 13, 2023

(65) Prior Publication Data

US 2024/0109276 A1    Apr. 4, 2024

Related U.S. Application Data

(60) Provisional application No. 63/412,594, filed on Oct. 3, 2022.

(51) Int. Cl.
*B32B 27/08* (2006.01)
*B32B 5/02* (2006.01)
(Continued)

(52) U.S. Cl.
CPC .............. *B32B 27/08* (2013.01); *B32B 5/022* (2013.01); *B32B 5/266* (2021.05); *B32B 7/12* (2013.01);
(Continued)

(58) Field of Classification Search
CPC ........... B32B 5/022; B32B 5/266; B32B 7/12; B32B 21/08; B32B 21/10; B32B 27/12; B32B 27/18; B32B 27/32; B32B 27/34; B32B 27/36; B32B 37/06; B32B 37/10; B32B 37/1284; B32B 2250/40; B32B 2262/0261; B32B 2262/0276; B32B 2264/062; B32B 2305/18; B32B 2305/30;
(Continued)

(56) References Cited

U.S. PATENT DOCUMENTS 3,837,989 A * 9/1974 McCoy ................... B32B 27/14
52/406.1
4,965,977 A * 10/1990 White ..................... E04D 3/351
52/459
(Continued)

FOREIGN PATENT DOCUMENTS

EP    3 838 589 A1    6/2021
EP    4 039 435 A1    8/2022

OTHER PUBLICATIONS

Foreign Action other than Search Report on CA DTD Aug. 28, 2024.
Foreign Search Report on EP DTD Feb. 23, 2024.

*Primary Examiner* — Jennifer A Steele
(74) *Attorney, Agent, or Firm* — FOLEY & LARDNER LLP

(57) ABSTRACT

A coverboard panel may include a first facer layer including a non-porous synthetic polymer, a core layer, and a second facer layer, wherein the core layer is disposed between the first facer layer and the second facer layer, and wherein the coverboard panel is configured to be installed with the first facer layer bonded to a membrane.

17 Claims, 6 Drawing Sheets

(51) Int. Cl.
| | |
|---|---|
| B32B 5/26 | (2006.01) |
| B32B 7/12 | (2006.01) |
| B32B 13/12 | (2006.01) |
| B32B 13/14 | (2006.01) |
| B32B 15/085 | (2006.01) |
| B32B 15/14 | (2006.01) |
| B32B 15/20 | (2006.01) |
| B32B 21/08 | (2006.01) |
| B32B 21/10 | (2006.01) |
| B32B 27/12 | (2006.01) |
| B32B 27/18 | (2006.01) |
| B32B 27/32 | (2006.01) |
| B32B 27/34 | (2006.01) |
| B32B 27/36 | (2006.01) |
| B32B 37/06 | (2006.01) |
| B32B 37/10 | (2006.01) |
| B32B 37/12 | (2006.01) |

(52) U.S. Cl.
CPC ............ *B32B 13/12* (2013.01); *B32B 13/14* (2013.01); *B32B 15/085* (2013.01); *B32B 15/14* (2013.01); *B32B 15/20* (2013.01); *B32B 21/08* (2013.01); *B32B 21/10* (2013.01); *B32B 27/12* (2013.01); *B32B 27/18* (2013.01); *B32B 27/32* (2013.01); *B32B 27/34* (2013.01); *B32B 27/36* (2013.01); *B32B 37/06* (2013.01); *B32B 37/10* (2013.01); *B32B 37/1284* (2013.01); *B32B 2250/40* (2013.01); *B32B 2262/0261* (2013.01); *B32B 2262/0276* (2013.01); *B32B 2264/062* (2013.01); *B32B 2305/18* (2013.01); *B32B 2305/30* (2013.01); *B32B 2307/581* (2013.01); *B32B 2307/5825* (2013.01); *B32B 2307/748* (2013.01); *B32B 2309/02* (2013.01); *B32B 2311/24* (2013.01); *B32B 2315/085* (2013.01); *B32B 2317/12* (2013.01); *B32B 2323/04* (2013.01); *B32B 2367/00* (2013.01); *B32B 2377/00* (2013.01); *B32B 2419/06* (2013.01)

(58) Field of Classification Search
CPC ...... B32B 2307/581; B32B 2307/5825; B32B 2307/748; B32B 2309/02; B32B 2311/24; B32B 2315/085; B32B 2317/12; B32B 2323/04; B32B 2367/00; B32B 2377/00; B32B 2419/06; B32B 2250/03; B32B 21/02; Y10T 428/00; E04D 12/00; E04D 5/148
See application file for complete search history.

(56) References Cited

U.S. PATENT DOCUMENTS

| | | | | |
|---|---|---|---|---|
| 5,735,092 | A * | 4/1998 | Clayton | B32B 5/18 52/794.1 |
| 5,834,082 | A * | 11/1998 | Day | E04C 2/296 428/56 |
| 5,891,563 | A * | 4/1999 | Letts | B32B 27/34 428/140 |
| 7,972,688 | B2 * | 7/2011 | Letts | B32B 5/18 428/319.3 |
| 11,060,290 | B1 | 7/2021 | Raymna, Jr. et al. | |
| 2002/0037405 | A1 * | 3/2002 | Naipawer, III | B32B 7/12 428/354 |
| 2005/0009428 | A1 * | 1/2005 | Porter | C04B 14/42 442/72 |
| 2006/0096205 | A1 * | 5/2006 | Griffin | E04D 3/18 52/309.4 |
| 2006/0275561 | A1 * | 12/2006 | Agrawal | E04D 3/351 428/2 |
| 2007/0022711 | A1 * | 2/2007 | Paradis | B32B 5/022 52/796.1 |
| 2009/0110885 | A1 * | 4/2009 | Paradis | B32B 5/26 156/77 |
| 2018/0266112 | A1 | 9/2018 | Kelly | |
| 2021/0189732 | A1 * | 6/2021 | Rayman, Jr. | E04D 13/16 |

* cited by examiner

200

| IMPACT OF FACER LAYER ON WATER ABSORPTION AND EDGE SWELL FOR PANEL 1/2" THICK AND 49 PCF | | | |
|---|---|---|---|
| Top & Bottom Facer Layers | Top & Bottom Adhesive Layers | Water Absorption (%) after Soaking for 24 hours | Edge Swell (%) after Soaking for 24 hours |
| Nonwoven Fiberglass Mat (top) & Paper (bottom) | Polyethylene Film | 42.3 | 26.3 |
| Polyester Film | Polyethylene Film | 40.1 | 20.6 |

FIG. 2A

IMPACT OF FACER LAYER ON WATER ABSORPTION AND EDGE SWELL FOR PANEL 3/8" THICK AND 57 PCF

| Top & Bottom Facer Layers | Top & Bottom Adhesive Layers | Water Absorption (%) after Soaking for 24 hours | Edge Swell (%) after Soaking for 24 hours |
|---|---|---|---|
| Nonwoven Fiberglass Mat (top) & Paper (bottom) | Polyethylene Film | 29.8 | 29.1 |
| Polyester Film | Polyethylene Film | 20.7 | 23.8 |

FIG. 2B

| MEMBRANE PEEL STRENGTH TEST RESULTS ||||
| --- | --- | --- | --- |
| Top Facer Layer on Coverboard | Membrane Material Type (thickness) | Adhesive Between Membrane & Coverboard | Average Peel Strength (lb/in) |
| Nonwoven Fiberglass Mat | FIBERTITE (36 mil) | Solvent Mastic (FTR-190e) | 4.26 |
| Nonwoven Fiberglass Mat | GAF Thermoplastic Polyolefin (TPO) (45 mil) | Solvent Mastic (EVERGUARD) | 4.44 |
| Nonwoven Fiberglass Mat | INDUSTRIES BEST (60 mil) | Waterbase Mastic (INDUSTRIES BEST) | 3.71 |
| Nylon Film | FIBERTITE (36 mil) | Solvent Mastic (FTR-190e) | 5.27 |
| Nylon Film | GAF Thermoplastic Polyolefin (TPO) (45 mil) | Solvent Mastic (EVERGUARD) | 5.15 |
| Nylon Film | INDUSTRIES BEST (60 mil) | Waterbase Mastic (INDUSTRIES BEST) | 4.45 |
| Polyester Film | FIBERTITE (36 mil) | Solvent Mastic (FTR-190e) | 9.03 |
| Polyester Film | GAF Thermoplastic Polyolefin (TPO) (45 mil) | Solvent Mastic (EVERGUARD) | 8.65 |
| Polyester Film | INDUSTRIES BEST (60 mil) | Waterbase Mastic (INDUSTRIES BEST) | 7.86 |

FIG. 3

| IMPACT OF ADHESIVE LAYER ON WATER ABSORPTION AND EDGE SWELL FOR PANEL 3/8" THICK AND 50 PCF ||||
|---|---|---|---|
| Top & Bottom Facer Layers | Top & Bottom Adhesive Layers | Water Absorption (%) after Soaking for 24 hours | Edge Swell (%) after Soaking for 24 hours |
| Polyester Film | Polyethylene Film | 66.9 | 47.9 |
| Polyester Film | Laminate of Polyethylene film, Aluminum Foil, & Film Including Polypropylene | 48.8 | 22.6 |

FIG. 4

WATER-RESISTANT ROOF COVERBOARD PANELS

CROSS-REFERENCE TO RELATED APPLICATIONS

This application claims priority to U.S. Provisional Application No. 63/412,594, filed Oct. 3, 2022, which application is incorporated herein by reference in its entirety.

BACKGROUND

Low slope commercial roofs generally include four layers. The base of the roof is a fluted steel deck. A rigid insulating foam board, such as polyisocyanurate foam board or expanded polystyrene, is installed directly over the deck. A protective coverboard is positioned directly over the insulating foam and is typically secured with screws that extend through the insulating foam and into the deck. A water-resistant membrane is then installed over the protective coverboard and is attached to the coverboard with either adhesives or mechanical fasteners. The water-resistant membrane prevents water from penetrating the roof. However, the protective coverboard may be exposed to water before or during installation, causing swelling of the protective coverboard and trapping water beneath the water-resistant membrane.

SUMMARY

Aspects of the present disclosure relate to a coverboard panel including a top facer, a core layer, and a bottom facer, where the top facer includes a synthetic polymer sheet good with a melt-point greater than about 350° F.

BRIEF DESCRIPTION OF THE DRAWINGS

FIG. 2A is a table showing 24-hour water absorption and edge swell values for coverboards ½ inches thick and 49 pounds per cubic foot (PCF) having different facer layers.

FIG. 2B is a table showing 24-hour water absorption and edge swell values for coverboards ⅜ inches thick and 57 PCF having different facer layers.

FIG. 3 is a table showing bond strength between various coverboards (with different top facers) and membranes wherein different adhesive types are utilized between the membrane and the top facer.

FIG. 4 is a table showing 24-hour water absorption and edge swell values for coverboards ⅜ inches thick and 50 PCF having different adhesive layers.

Figure 1:
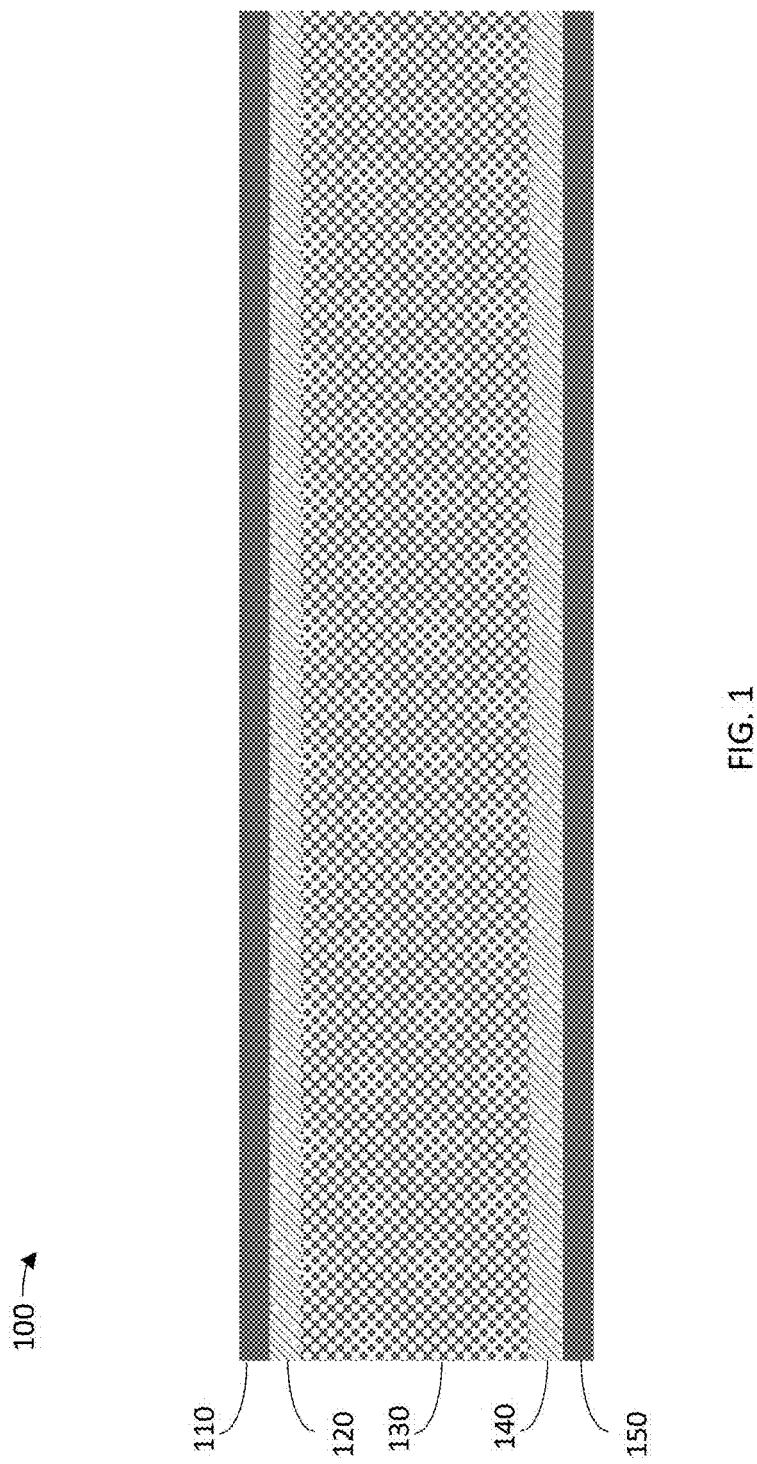
FIG. 1 illustrates an example coverboard.

The foregoing and other features of the present disclosure will become apparent from the following description and appended claims, taken in conjunction with the accompanying drawings. Understanding that these drawings depict only several embodiments in accordance with the disclosure and are therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

This disclosure relates to flexible composite panels having facer layers on the top and bottom major surfaces. For example, roof coverboard panels made by Continuus Materials have relatively low bending modulus values (see U.S. Pat. No. 11,060,290). Compositions of this type can have exceptional impact resistance, which makes them ideal for roof coverboard applications where resistance to hail is required. Likewise, these flexible panels can conform to irregular sub-structures, such as those found along the perimeter of low-slope roofs.

Commercial roofs can be classified as either "low slope" or "steep slope". Low slope roofs have a pitch that is less than 25%. Most low slope roofs have a pitch of only 2%, Steep slope roofs have a pitch that is greater than 25%. Low slope roofs experience greater exposure to slow-draining water, more direct impact to hail stones, and greater foot-traffic.

Low slope commercial roofs are comprised of four essential layers. The base of the assembly is typically a fluted steel deck. Less frequently, oriented strand board (OSB), plywood, or concrete can be used as decking. A rigid insulating foam board, such as polyisocyanurate foam board or expanded polystyrene, is installed directly over the deck. A protective coverboard is positioned directly over the insulating foam and is typically secured with screws that extend through the insulating foam and into the deck. A water-resistant membrane is then installed over the protective coverboard and is most commonly attached to the coverboard with adhesives.

Additional layers can also be incorporated into low slope roof assemblies. In many cases an air and vapor barrier, such as polyethylene film (6 mil thick) is installed between the deck and the insulating foam. In some cases, rock ballast or concrete pavers can be placed between the insulating foam and the coverboard.

Many different membrane types can be used for low slope roofs. Common membranes include thermoplastic olefin (TPO), polyvinyl chloride (PVC), and built-up membrane roofing (BUR). TPO is generally comprised of a mixture of polyolefin (either polyethylene or polypropylene), dispersed rubber, and dispersed inorganic filler, such as talc or wollastonite. PVC membranes are most commonly plasticized polyvinyl chloride. BUR is typically based on alternating layers of asphalt and fiberglass felt. Bitumen is used to attach the BUR to the coverboard panel. Modified bitumen (MB), thermoplastic single-ply membranes (polyvinyl chloride, thermoplastic polyolefin, polymers based on ketone ethylene ester) or thermoset single-ply membranes (including polymers based on ethylene propylene diene monomer) are also used as membranes. Yet another membrane type is mesh-reinforced membrane coating (MREC), which is based on alternating layers of acrylic elastomeric resin and polyester reinforcing mat. In many cases, solvent-based synthetic rubber adhesives, mastics, or polyurethane adhesives are applied to the coverboard, as adhesives, just prior to membrane installation.

A primary function of the roof coverboard is to protect the insulating foam, installed directly beneath it, from mechanical damage. In the absence of the coverboard, the insulating foam could easily be damaged by hail stones, foot traffic, construction activity on the roof, or other events.

Historically, roof coverboard products have included gypsum and cement-based panels. Gypsum panels are broadly used in commercial and residential construction. For interior applications, where panels are maintained in a dry state, a type of gypsum with paper outer layers can be used. For exterior applications, including those associated with potential exposure to precipitation, a type of gypsum with outer layers of nonwoven fiberglass mat is typically used. The nonwoven fiberglass mat is made from short glass fibers and binders, such as acrylic resins, thermosetting resins, or mixtures of acrylic resins and thermosetting resins. Compared to paper, the nonwoven fiberglass mat is much more resistant to water. Due to the risk of water exposure, especially during the installation process, a majority of roof coverboards do include an outer layer of nonwoven fiberglass mat on at least the top major surface of the panel as it is installed. Some roof coverboards include an outer layer of paper, especially on the bottom major surface of the panel as it is installed.

Outer surface layers on coverboards, such as nonwoven fiberglass mat and paper, can have a porous surface, which can promote bond formation when adhesives are used to secure the membrane to the coverboard. In general, greater bond strength between the membrane and the coverboard is important because the roof assembly needs to be able to resist wind uplift loads.

Unfortunately, the porous nature of the facer layers also promotes relatively fast water absorption when the coverboard panels are exposed to rain during installation events. Most coverboards can exhibit swell as they absorb water. If the water is absorbed in the panel in a manner that is not uniformly distributed, then the associated swelling can be non-uniformly distributed. Coverboard panels that are swollen, especially in a non-uniform manner, can be difficult to properly fit together during the installation process. Also, the top major surface of an array of installed panels that are swollen in a non-uniform manner can have an irregular topography and can be problematic for membrane installation.

Some coverboard panel types, such as wooden oriented strandboard (OSB), do not have outer surface layers, such as nonwoven fiberglass mat or paper. These wood-based panels also readily absorb water and exhibit non-uniform swelling that can result in membrane installation problems.

To the extent that roof membranes have relatively very low permeance to water, it is also undesirable to install wet coverboard panels underneath the membrane. As an example, if coverboard panels are exposed to precipitation while being transported to a job site, or if they are exposed to precipitation while being stored at a job site, and significant absorption of water into the coverboard occurs, and the coverboard panels are then installed and covered with a membrane, then elevated levels of water can be inadvertently introduced into the roof system. In addition to promoting swelling, the elevated levels of water can promote microbial activity, freeze/thaw damage, and other complications.

Yet another issue relating to the use of nonwoven fiberglass mat and paper as major surface layers in roof coverboard applications relates to the risk of these materials being punctured or torn during the installation process. For example, coverboards can be dragged across various sharp objects during the installation event. There is some potential for the top or bottom major surface layers to be punctured or torn when this occurs. Damage of this sort can compromise the performance of the coverboard.

For all of the above reasons, there is a need for a roof coverboard panel that bonds strongly to common membranes using commercially-available adhesives, but simultaneously exhibits slow water absorption rate when exposed to precipitation. To the extent that porous surfaces are well known to facilitate bond formation in adhesive applications, but are also known to promote faster water absorption, the combined objective of high bond strength and slow water absorption in a roof coverboard application would seem to be an inherent contradiction. Furthermore, there is a need for coverboards that have major surface layers with improved toughness, puncture-resistance, and tear-resistance.

The current disclosure solves the technical problem of coverboards absorbing water before or during installation. Coverboards which absorb water may swell, interfering with uniform installation. Additionally, the exterior surface of installed coverboards which have swollen may be non-uniform, preventing uniform installation of a membrane. A coverboard having a top layer including a synthetic polymer sheet good may have low water absorption, preventing or reducing swelling due to water absorption. Surprisingly, synthetic polymer sheet goods may demonstrate high bond strength with membrane adhesives relative to conventional coverboard materials, despite being non-porous. It would be expected that more porous materials would exhibit higher bond strength and less porous materials would exhibit lower bond strength. High bond strength between membrane adhesives and non-porous synthetic polymer sheet goods is an unexpected result. Additionally, coverboards having top layers including synthetic polymer sheet goods may have improved toughness relative to conventional coverboards, preventing or reducing punctures or tears. Additionally, exterior layers of coverboards including synthetic polymer sheet goods may prevent plastics in core layers of the coverboards from bleeding through to presses used in consolidating the coverboards, solving the technical problem of fouling of press belts during manufacture of coverboards including core layers having plastic fragments.

The current disclosure also solves the technical problem of edge swell, where coverboards swell due to water absorption at their edges, interfering with uniform installation of the coverboards and membrane. Surprisingly, the use of synthetic polymer sheet goods in exterior layers of the coverboards reduces edge swell and water absorption. This effect can be even more dramatic when synthetic polymer sheet goods are used in conjunction with aluminum foil within the bonding layers between the facers and the core layer. It would be expected that facer layers would not appreciably impact edge swell and that edge swell would be caused primarily by water absorption at the edges of the coverboard. Reduced edge swell in coverboards having exterior layers including synthetic polymer sheet goods is an unexpected result.

Coverboard panels comprising certain synthetic polymer sheet goods with a melt-point greater than about 350° F. can provide a combination of relatively low water absorption rate and unexpectedly high bond strength to membranes using adhesives that are commonly used in membrane installations.

A coverboard panel as described herein may include two major surface layers and a core layer. Either one or two major surfaces comprise a synthetic polymer sheet good with a melt-point greater than about 350° F. A relatively thick core layer may exist between the top and bottom major surfaces.

FIG. 1 illustrates an example coverboard 100. The coverboard 100 may include a top facer 110, a top adhesive 120, a core layer 130, a bottom adhesive 140, and a bottom facer 150. The top facer 110 may be a top surface or top major surface layer of the coverboard when the coverboard is installed. The bottom facer 150 may be a bottom surface or bottom major surface layer of the coverboard when the coverboard is installed. In some embodiments, the top facer 110 may be attached to the core layer 130 by the top adhesive 120 and the bottom facer 150 may be attached to the core layer 130 by the bottom adhesive 140. The top adhesive 120 and the bottom adhesive 140 may include a thermosetting adhesive, a thermoplastic adhesive, a polyethylene film, a polypropylene film, or any type of adhesive or combination of adhesives. In other embodiments, the top facer 110 and the bottom facer 150 may be attached to the core layer 130 using mechanical fasteners or other attachment means and the coverboard 100 may omit the top adhesive 120 and the bottom adhesive 140.

The core layer 130 may include a variety of materials or combinations of materials. In some embodiments, the core layer 130 may include an inorganic material, such as gypsum, magnesium oxide, or Portland cement. In some embodiments, the inorganic material may be fortified with fibers or other additives. In other embodiments, the core layer may include wood, such as plywood, oriented strandboard, fiberboard, or particleboard.

In yet other embodiments, the core layer may include a thermally-fused mixture of paper fragments and plastic fragments. Paper and plastic fragments may be shaped as irregular plates. In some embodiments, the paper and plastic fragments may have a diameter of about 0.010-2.000" and a thickness of about 0.005-0.050". Paper fragments can be made by milling pieces of paper until the milled material passes a screen with a particular mesh size. Paper subjected to the milling process can be newspaper, advertising, office paper, packaging, or other paper products. The paper may be virgin material, or it can be recycled or sourced from waste streams. Generating paper fragments from waste or recycling streams has the advantage of being low cost and helps to resolve a world-wide sustainability problem. In some embodiments, paper fragments having a thickness and diameter of less than about 0.020" may be used.

Plastic fragments may include polypropylene, polystyrene, polyester, nylon, rubber (natural and synthetic), polyvinyl chloride, polyethylene (including LLDPE, LDPE, MDPE, HDPE), copolymers of ethylene and propylene, other commercial plastics, or any other plastic. In some embodiments, polyethylene based plastics, especially low and medium density polyethylene resins, may be used. The plastic fragments may be a mixture of different types of polymers. In some embodiments, the plastic may contain plasticizers, such as dioctyl phthalate or benzyl butyl phthalate, colorants, stabilizers, preservatives, and other functional additives. Plastic fragments may be prepared by milling pieces of plastic. The plastic may be virgin film material, or it can be recycled or sourced from waste streams (films, packaging, or a wide array of plastic articles). Generating plastic fragments from waste or recycling streams has the advantage of being low cost and helps to resolve a world-wide sustainability problem. In some embodiments, plastic fragments having a thickness and a diameter of less than about 0.020" may be used.

In some embodiments, individual fragments may include both paper and plastic. For example, many packaging materials found in waste streams include a plurality of alternating paper and plastic layers. In some cases, these packaging materials may include a layer of aluminum foil or a film that has been metalized on one surface. In some embodiments, fragments derived from all of these materials may be used.

In some embodiments, the core layer 130 may have a thickness ranging from about 0.1-1.0 inches. In some embodiments, the core layer 130 may have a thickness of about 0.20-0.60 inches. In some embodiments, the core layer 130 may have a density of about 15-75 pounds per cubic foot (PCF). In some embodiments, the core layer 130 may have a density of about 28-65 PCF.

Either or both of the top and bottom facers 110, 150 may include a synthetic polymer sheet good with a melt-point that is greater than about 350° F. In some embodiments, the synthetic polymer sheet good may include a polyester film. In other embodiments, the synthetic polymer sheet good may include a nylon film. In yet other embodiments, the synthetic polymer sheet good may include a spunbond polyester nonwoven. In yet other embodiments, the synthetic polymer sheet good may include a spunbond nylon nonwoven. A thickness of the synthetic polymer sheet good may be about 0.0005-0.100 inches. Either or both of the top and bottom facers 110, 150 may include a multi-layered material as long as one of the layers is a synthetic polymer with a melt-point that is greater than about 350° F.

The top and bottom facers 110, 150 may be attached to the core layer. Attachment can be achieved by use of mechanical fasteners, adhesives, or by other means. The adhesives may include thermosetting or thermoplastic type adhesives. The adhesives may include polyethylene and polypropylene films.

The new roof coverboard provides the combined advantages of having slower water absorption rate and can be adhered to membranes using conventional membrane adhesives with significantly improved bond strength. This latter characteristic can occur even when the synthetic polymer sheet good is a non-porous film, which is quite surprising and unexpected. Compared to coverboard panels that comprise a nonwoven fiberglass mat at the bond interface between the coverboard and the membrane, the new coverboard panel can be associated with a 10-100% increase in bond strength between the coverboard and the membrane when conventional membrane laminating adhesives are used, such as synthetic rubbers, mastic-based, or polyurethanes. Embodiments of the present disclosure can also have improved resistance to punctures or tears at the major surface layers. As screws with washers are used to attach embodiments of this disclosure, the interface between the washer and the major surface layer comprising synthetic polymer sheet good can have a seal that is more air-tight than that achieved with other coverboards.

FIG. 2A is an example table 200 showing 24-hour water absorption and edge swell values for a first example coverboard test sample and a second example coverboard test sample, each ½ inches thick and 49 pounds per cubic foot (PCF), where the first and second example coverboard test samples have different facer layers. In the table 200, water absorption is determined by dividing an amount of water absorbed in a 24-hour soak test by an initial dry mass of a test specimen and multiplying this quotient by 100%. This determination is a standard approach for calculating water absorption in the wood products industry and is different than a percentage of water in the specimen after soaking for 24 hours. Edge swell is calculated by dividing the change in thickness of the specimen by the initial dry thickness of the specimen and multiplying this quotient by 100%.

The first coverboard test sample has a top facer layer of a nonwoven fiberglass mat and a bottom facer layer of paper. Between a core layer and each of the top facer layer and the bottom facer layer are polyethylene films. The first coverboard test sample has a water absorption after soaking for 24 hours of 42.3%. The first coverboard test sample has an edge swell after soaking for 24 hours of 26.3%. The first coverboard test sample may be 6" by 6".

The second coverboard test sample has a top facer layer of a first polyester film and a bottom facer layer of a second polyester film. Between a core layer and each of the top facer layer and the bottom facer layer are polyethylene films. The second coverboard test sample has a water absorption after soaking for 24 hours of 40.1%. The second coverboard test sample has an edge swell after soaking for 24 hours of 20.6%. The second coverboard test sample may be 6" by 6". The difference between the edge swell of the first and second coverboard test samples is an unexpected result. It would be expected that facer layers would not appreciably impact edge swell and that edge swell would be caused primarily by water absorption at the edges of the coverboard.

FIG. 2B is an example table 210 showing 24-hour water absorption and edge swell values for a first example coverboard test sample and a second example coverboard test sample, each ⅜ inches thick and 57 PCF, where the first and second example coverboard test samples have different facer layers. In the table 210, water absorption is determined by dividing an amount of water absorbed in a 24-hour soak test by an initial dry mass of a test specimen and multiplying this quotient by 100%. This determination is a standard approach for calculating water absorption in the wood products industry and is different than a percentage of water in the specimen after soaking for 24 hours. Edge swell is calculated by dividing the change in thickness of the specimen by the initial dry thickness of the specimen and multiplying this quotient by 100%.

The first coverboard test sample has a top facer layer of a nonwoven fiberglass mat and a bottom facer layer of paper. Between a core layer and each of the top facer layer and the bottom facer layer are polyethylene films. The first coverboard test sample has a water absorption after soaking for 24 hours of 42.3%. The first coverboard test sample has an edge swell after soaking for 24 hours of 26.3%. The first coverboard test sample may be 6" by 6".

The second coverboard test sample has a top facer layer of a first polyester film and a bottom facer layer of a second polyester film. Between a core layer and each of the top facer layer and the bottom facer layer are polyethylene films. The second coverboard test sample has a water absorption after soaking for 24 hours of 40.1%. The second coverboard test sample has an edge swell after soaking for 24 hours of 20.6%. The second coverboard test sample may be 6" by 6". The difference between the edge swell of the first and second coverboard test samples is an unexpected result. It would be expected that facer layers would not appreciably impact edge swell and that edge swell would be caused primarily by water absorption at the edges of the coverboard.

FIG. 3 is an example table 300 showing bond strength between various coverboards (with different top facers) and membranes wherein different adhesive types are utilized between the membrane and the top facer. In the table 300, membrane-adhesive pairs include commonly used roofing membranes and adhesives.

The table 300 shows that for each membrane-adhesive pair, a polyester film top facer layer has a higher peel strength with the membrane than a nylon film top facer layer which has a higher peel strength with the membrane than a nonwoven fiberglass mat. The table 300 shows an unexpected result. As the nylon film and the polyester film are non-porous materials, it would not be expected for the nylon film and polyester films to have a higher bond strength with membranes than the nonwoven fiberglass mat, a porous material. It is unexpected that a nylon film or polyester film facer layer would bond as well to a membrane adhesive as a nonwoven fiberglass mat facer layer, much less that a nylon film or polyester film facer layer would bond more strongly to a membrane adhesive than a nonwoven fiberglass mat facer layer.

FIG. 2B is an example table 210 showing 24-hour water absorption and edge swell values for a first example coverboard test sample and a second example coverboard test sample, each ⅜ inches thick and 57 PCF, where the first and second example coverboard test samples have different facer layers.

FIG. 4 is a table 400 showing 24-hour water absorption and edge swell values for a first coverboard test sample and a second coverboard test sample, each ⅜ inches thick and 50 PCF, where the first and second coverboard test samples have different adhesive layers. Additionally, each of the first and second coverboard test samples include a surface active agent in the core layer that increases the water absorption rate. The first and second coverboard test samples have equal levels of the surface active agent in the core layer.

The first coverboard test sample has top and bottom facer layers of polyester film. Between a core layer and each of the top facer layer and the bottom facer layer are adhesive layers of polyethylene film. The first coverboard test sample has a water absorption after soaking for 24 hours of 66.9%. The first coverboard test sample has an edge swell after soaking for 24 hours of 47.9%.

The second coverboard test sample has top and bottom facer layers of polyester film Between a core layer and each of the top facer layer and the bottom facer layer are adhesive layers of a laminate of polyethylene film, aluminum foil, and film including polypropylene. The second coverboard test sample has a water absorption after soaking for 24 hours of 48.8%. The second coverboard test sample has an edge swell after soaking for 24 hours of 22.6%. The difference between the edge swell of the first and second coverboard test samples is an unexpected result. It would be expected that adhesive layers would not appreciably impact edge swell and that edge swell would be caused primarily by water absorption at the edges of the coverboard.

Figure 5:
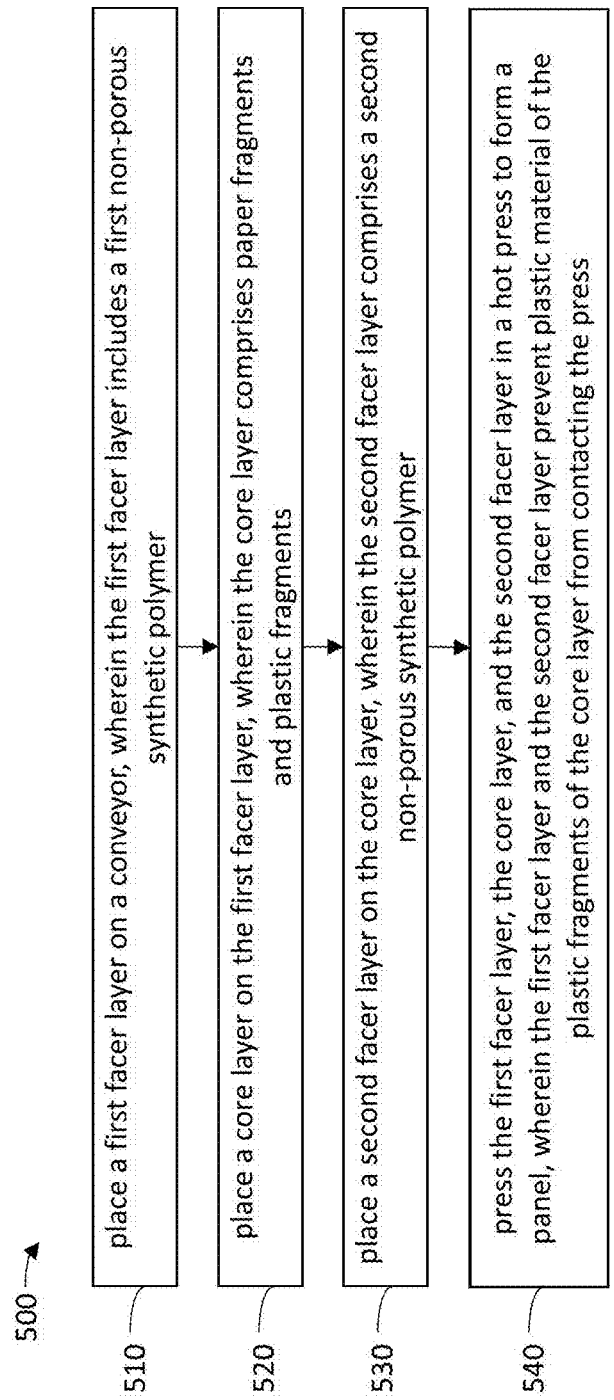
FIG. 5 illustrates a method for manufacturing a coverboard.

FIG. 5 illustrates a method 500 for manufacturing a coverboard. The method 500 may include more, fewer, or different operations than shown. The operations may be performed in the order shown, in a different order, or concurrently.

At 510, a first facer layer is placed on a conveyor, wherein the first facer layer includes a first non-porous synthetic polymer. The first non-porous synthetic polymer may be a polyester film, a nylon film, a polyester nonwoven, a nylon nonwoven, or another synthetic polymer. In some embodiments, the conveyor may be used to manufacture a continuous sheet of coverboard material. The first facer layer (and successive layers) may be placed as a continuous sheet on the conveyor. The first facer layer may have a melt-point greater than 350° F.

At 520, a core layer is placed on the first facer layer, wherein the core layer comprises paper fragments and plastic fragments. In some embodiments, a first adhesive layer is placed between the first facer layer and the core layer. The first adhesive layer may be configured to bind the first facer layer and the core layer together. The first adhesive layer may be a thermosetting adhesive, a thermoplastic adhesive, a polyethylene film, a polypropylene film, or any type of adhesive or combination of adhesives. The first adhesive layer may include aluminum foil. The first adhesive layer may include a laminate including polyethylene film, aluminum foil, and/or a film including polypropylene.

At 530, a second facer layer is placed on the core layer, wherein the second facer layer comprises a second non-porous synthetic polymer. In some embodiments, the second non-porous synthetic polymer is the same as the first non-porous synthetic polymer. In other embodiments, the second non-porous synthetic polymer is different from the first non-porous synthetic polymer. The first facer layer may be a top surface of a coverboard panel, such that when the coverboard is installed, the first facer layer faces upwards and is attached to a membrane. In some embodiments, a second adhesive layer is placed between the second facer layer and the core layer. The second adhesive layer may be configured to bind the second facer layer and the core layer together. The second adhesive layer may be a thermosetting adhesive, a thermoplastic adhesive, a polyethylene film, a polypropylene film, or any type of adhesive or combination of adhesives. The second adhesive layer may include aluminum foil. The second adhesive layer may include a laminate including polyethylene film, aluminum foil, and/or a film including polypropylene. In some embodiments, the first adhesive layer and the second adhesive layer are the same. In other embodiments, the first adhesive layer and the second adhesive layer are different.

Operations 510-530 may be performed in reverse order, such that the second facer layer is placed on the conveyor, the core layer is placed on the second facer layer, and the first facer layer is placed on the core layer.

At 540, the first facer layer, the core layer, and the second facer layer are pressed in a hot press to form a panel. The hot press may have a temperature less than or equal to 350° F. The first facer layer and the second facer layer may prevent plastic material of the plastic fragments of the core layer from contacting the press. The paper fragments and the plastic fragments of the core layer may be heated and thermally fused in the hot press. The plastic fragments may be at least partially melted. Porous facer layers may allow plastic material of the plastic fragments to pass through the porous facer layers and contact the hot press. Plastic material on the hot press may burn and/or prevent the hot press from successfully pressing panels. Using non-porous synthetic polymer facer layers solves the technical problem of plastic material sticking to the press.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

Non-Limiting Examples

Example 1. A panel comprising a core layer and two major surface layers; wherein one of the major surface layers comprises a synthetic polymer sheet good with a melt-point greater than about 350° F.

Example 2. The panel of example 1, wherein one or two major surface layers comprise a polyester film.

Example 3. The panel of example 1, wherein one or two major surface layers comprise a nylon film.

Example 4. The panel of example 1, wherein one or two major surface layers comprise a polyester nonwoven.

Example 5. The panel of example 1, wherein one or two major surface layers comprise a nylon nonwoven.

Example 6. The panel of example 1, wherein the core layer comprises thermally fused paper and plastic fragments.

Example 7. The panel of example 1, wherein the core layer comprises wood.

Example 8. The panel of example 1, wherein the core layer comprises an inorganic cement.

Example 9. A panel comprising a core layer and two major surface layers; wherein two of the major surface layers comprises a synthetic polymer sheet good with a melt-point greater than about 350° F.

Example 10. The panel of example 9, wherein one or two major surface layers comprise a polyester film.

Example 11. The panel of example 9, wherein one or two major surface layers comprise a nylon film.

Example 12. The panel of example 9, wherein one or two major surface layers comprise a polyester nonwoven.

Example 13. The panel of example 9, wherein one or two major surface layers comprise a nylon nonwoven.

Example 14. The panel of example 9, wherein the core layer comprises thermally fused paper and plastic fragments.

Example 15. The panel of example 9, wherein the core layer comprises wood.

Example 16. The panel of example 9, wherein the core layer comprises an inorganic cement.

Example 17. A system for constructing low-slope roofs, wherein roof coverboards, comprising one synthetic polymer sheet good major surface layer, are transported to a job site, stored at the job site, and installed in a roof system, such that the coverboard panels exist in a state of lower moisture content, the bond between the membrane and the coverboard is stronger, and the major surface layer comprising synthetic polymer sheet good is more resistant to punctures and tears.

Example 17. A system for constructing low-slope roofs, wherein roof coverboards, comprising two synthetic polymer sheet good major surface layers, are transported to a job site, stored at the job site, and installed in a roof system, such that the coverboard panels exist in a state of lower moisture content, the bond between the membrane and the coverboard is stronger, and the major surface layers comprising synthetic polymer sheet good are more resistant to punctures and tears.

What is claimed is:

1. A coverboard panel comprising:
a first facer layer consisting essentially of a non-porous synthetic polymer selected from polyester film or nylon film, wherein the first facer layer has low water absorption and low air permeability;
a core layer comprising thermally fused paper fragments and plastic fragments; and
a second facer layer, wherein the core layer is disposed between the first facer layer and the second facer layer, and wherein the coverboard panel is configured to be installed with the first facer layer bonded to a membrane selected from TPO or PVC via a mastic adhesive, and wherein the first facer layer exhibits a peel strength with the mastic adhesive of at least 5 lbs/in.

2. The coverboard panel of claim 1, further comprising:
a first adhesive layer disposed between the first facer layer and the core layer, wherein the first adhesive layer is configured to bind the first facer layer and the core layer together; and
a second adhesive layer disposed between the second facer layer and the core layer, wherein the second adhesive layer is configured to bind the second facer layer and the core layer together.

3. The coverboard panel of claim 2, wherein the first and second adhesive layers comprise polypropylene.

4. The coverboard panel of claim 2, wherein the first adhesive layer comprises aluminum foil.

5. The coverboard panel of claim 1, wherein the first facer layer comprises a polyester film or nylon film reinforced with glass fibers.

6. The coverboard panel of claim 1, wherein the core layer includes polyisocyanurate foam having a density of 6-25 lbs/ft$^3$ and a filler material comprising calcium carbonate in an amount of 15-75 wt. %.

7. The coverboard panel of claim 1, wherein the core layer comprises thermally fused paper fragments and polypropylene plastic fragments in a ratio of 50-60% paper fragments to 15-25% polypropylene fragments by weight, and wherein the core layer has a density of 40-60 pcf with voids between fragments to provide flexibility.

8. The coverboard panel of claim 1, wherein the first facer layer binds with an adhesive for attaching coverboards to the membrane stronger than a nonwoven fiberglass mat binds with the adhesive.

9. The coverboard panel of claim 8, wherein a peel strength between the first facer layer and the adhesive is greater than 4 lbs./in.

10. The coverboard panel of claim 1, wherein the first adhesive layer comprises a laminate including polyethylene film and aluminum foil.

11. The coverboard panel of claim 10, wherein an edge-swell of the coverboard panel after soaking for 24 hours is less than 40%.

12. A method comprising:
placing a first facer layer on a conveyor, wherein the first facer layer consists essentially of a first non-porous synthetic polymer selected from polyester film or nylon film having a melt-point greater than 350° F.;
placing a core layer on the first facer layer, wherein the core layer comprises paper fragments and polypropylene plastic fragments;
placing a second facer layer on the core layer, wherein the second facer layer comprises a second non-porous synthetic polymer;
pressing the first facer layer, the core layer, and the second facer layer in a hot press at a temperature of 350-425°

F. to form a panel, wherein the first facer layer and the second facer layer prevent plastic material of the polypropylene plastic fragments of the core layer from melting through and contacting the press during pressing, and wherein pressing thermally fuses the paper fragments to the polypropylene plastic fragments in the core layer, and wherein the panel is configured to be installed with the first facer layer bonded to a membrane selected from TPO or PVC via a mastic adhesive, and wherein the first facer layer exhibits a peel strength with the mastic adhesive of at least 5 lbs/in.

13. The method of claim 12, further comprising:

placing a first adhesive layer between the first facer layer and the core layer, wherein the first adhesive layer is configured to bind the first facer layer and the core layer together; and a second adhesive layer disposed between the second facer layer and the core layer, wherein the second adhesive layer is configured to bind the second facer layer and the core layer together.

14. The method of claim 13, wherein the first adhesive layer comprises a laminate including polyethylene film and aluminum foil.

15. The method of claim 12, wherein the first facer layer has a melt-point greater than 350° F., and wherein the hot press has a temperature less than or equal to 350° F.

16. The method of claim 12, wherein pressing the first facer layer, the core layer, and the second facer layer in a hot press to form a panel comprises heating the core layer, using the hot press, to thermally fuse paper fragments and the plastic fragments of the core layer.

17. The method of claim 12, wherein the first facer layer binds with an adhesive for attaching coverboards to a membrane stronger than a nonwoven fiberglass mat binds with the adhesive.

* * * * *